United States Patent [19]

Nanzai

[11] Patent Number: 4,906,014
[45] Date of Patent: Mar. 6, 1990

[54] FLATCAR FOR CARRYING THE BURDEN
[75] Inventor: Takashi Nanzai, Fujisawa, Japan
[73] Assignee: Sagami Tsushin Kogyo Co., Ltd., Kanagawa, Japan
[21] Appl. No.: 304,861
[22] Filed: Jan. 30, 1989

Related U.S. Application Data

[63] Continuation of Ser. No. 59,351, Jun. 8, 1987, abandoned.

[30] Foreign Application Priority Data

Jun. 11, 1986 [JP] Japan .............................. 61-135231

[51] Int. Cl.[4] .............................................. B62B 1/08
[52] U.S. Cl. .................... 280/47.2; 280/5.28; 280/47.22
[58] Field of Search ............... 280/47.22, 47.2, 47.27, 280/47.28, 5.28, 43.1, 418

[56] References Cited

U.S. PATENT DOCUMENTS

| 427,655 | 5/1890 | Arnold | 280/47.22 |
|---|---|---|---|
| 501,706 | 7/1893 | Curtis | 280/47.22 |
| 1,407,235 | 2/1922 | Taylor | 280/47.33 |
| 1,636,682 | 7/1927 | Carlson | 280/47.33 |
| 1,679,885 | 8/1928 | Walker | 280/5.28 |
| 2,596,655 | 5/1952 | Converse | 280/47.22 |
| 2,598,168 | 5/1952 | Hooz et al. | 280/47.2 |
| 3,154,200 | 10/1964 | Versch et al. | 280/62 |

FOREIGN PATENT DOCUMENTS

| 255844 | 1/1964 | Australia | 280/5.28 |
|---|---|---|---|
| 27398 | 4/1921 | Denmark | 280/47.22 |
| 721740 | 3/1932 | France | 280/47.2 |

Primary Examiner—David M. Mitchell
Attorney, Agent, or Firm—Jordan and Hamburg

[57] ABSTRACT

A handtruck for use in carrying a load, comprises springs installed on a frame, a connection shaft received rotatably in bearings mounted on the opposite end portion of the springs and substantially parallel with the lateral extend of the frame, a support member for supporting a first pair of wheels which is fixed to the connection shaft, and another support member for supporting a second pair of wheels which is also firmly fixed to the same. A rotation shaft is rotatably mounted on the support member for supporting the second pair of wheels in order to cause the second wheels to rotate around the shaft axis approximately normal to the axis of the connection shaft.

20 Claims, 6 Drawing Sheets

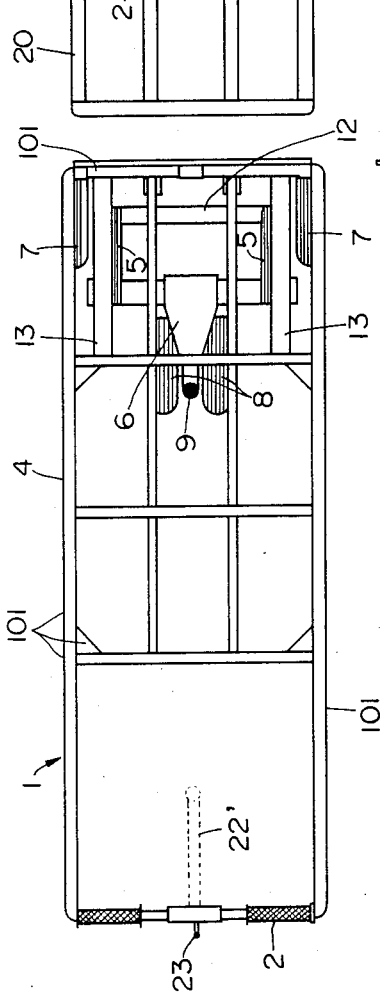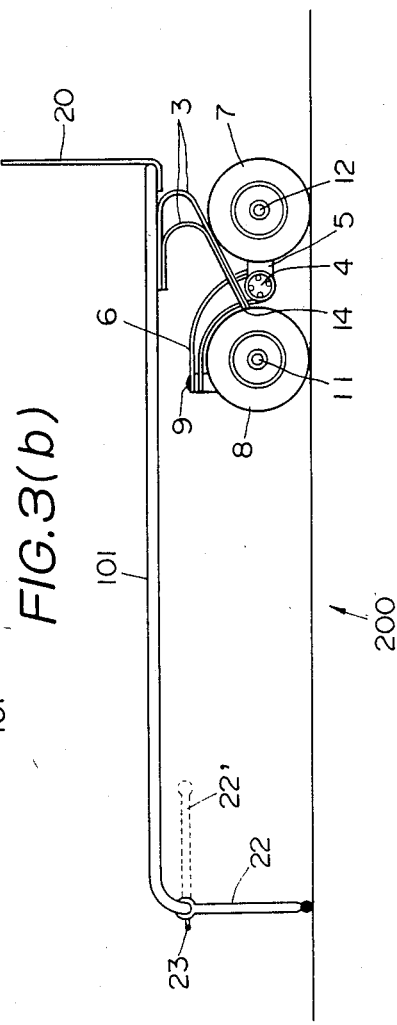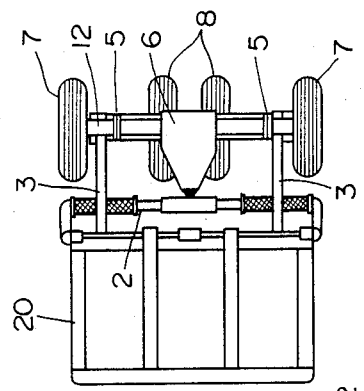

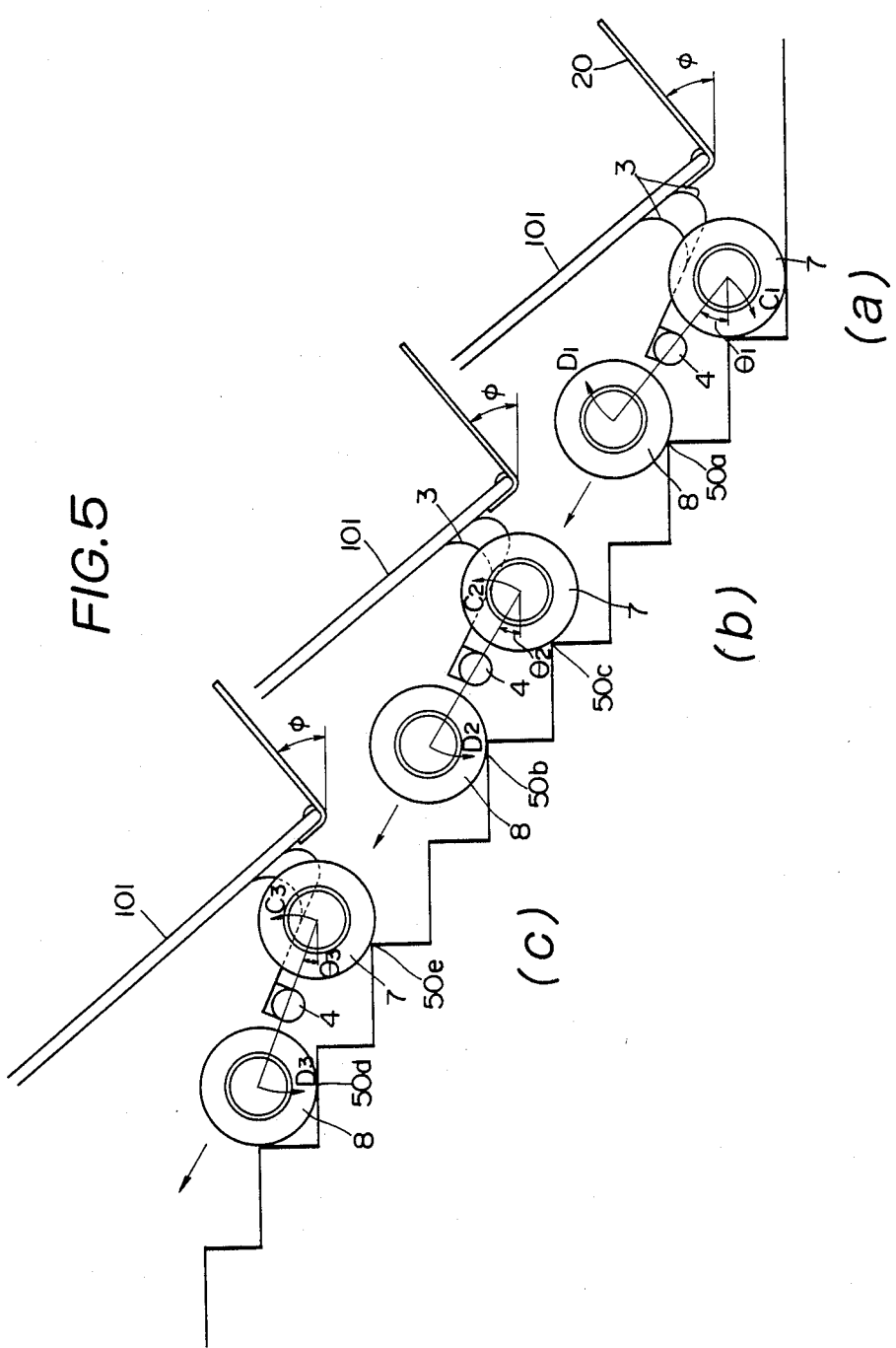

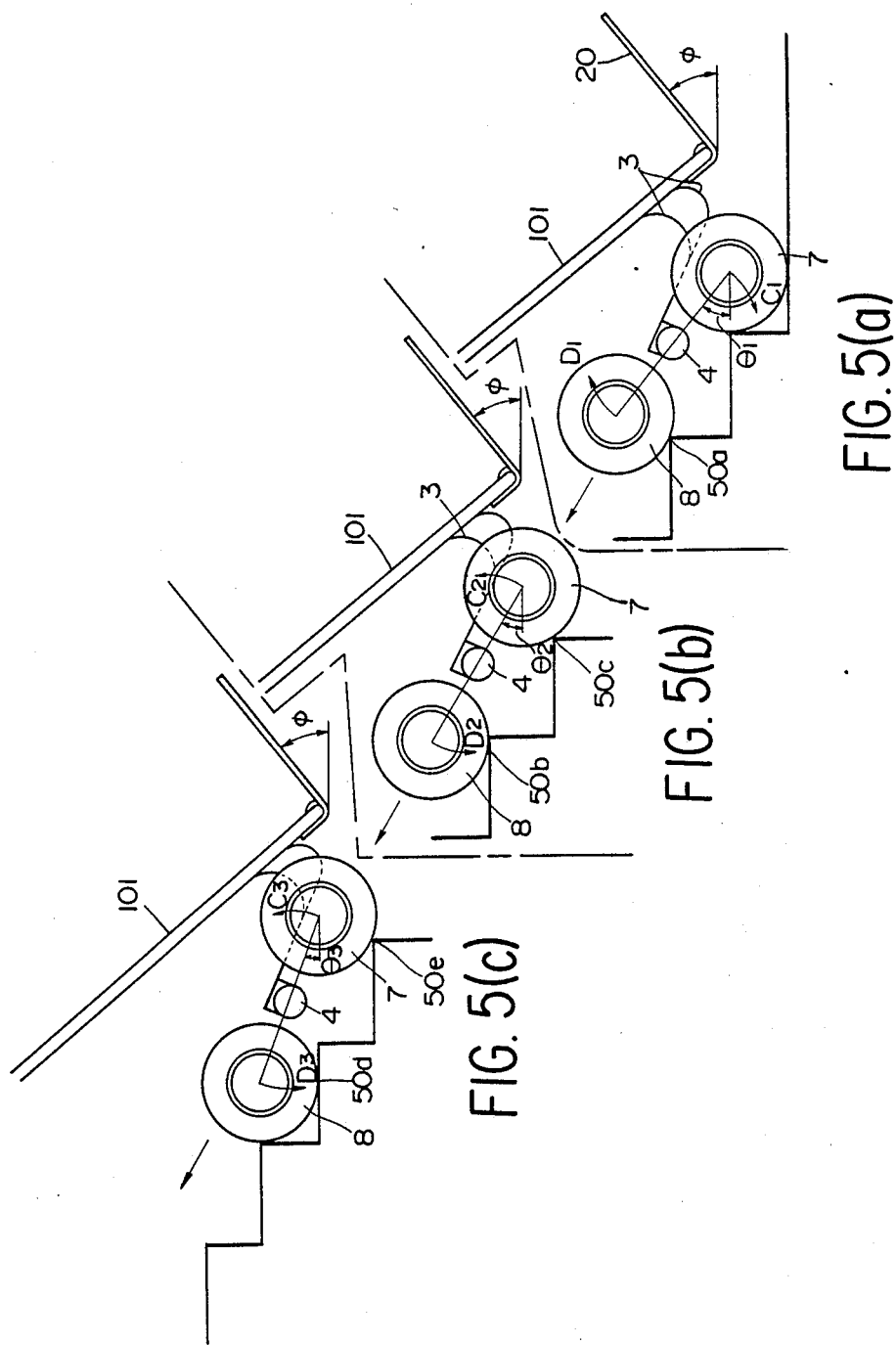

FLATCAR FOR CARRYING THE BURDEN

This application is a continuation of application Ser. No. 059,351, filed June 8, 1987 now abandoned.

BACKGROUND OF THE INVENTION

The present invention relates to a handtruck for carrying a load put on the handtruck by hand, in particular, a handtruck for carrying a load in which wheels are installed on the handtruck in order to facilitate transportation of the load.

Conventionally, a handtruck is provided with a rack or frame for receiving the load, a handle for manipulating the handtruck, and a back plate. Bearings are fixedly mounted on the frame. A wheel axle is rotatably carried by the bearings and wheels are installed at both sides of the wheel axle. The handtruck, having wheels installed in such a way, can be easily conveyed, in the case of conveying the same straight on a flat floor. However, since the wheels are so constructed that they cannot rotate around an axis normal to the wheel axle, it is not easy to change the direction of the handtruck. And further, the wheels are not installed so as to be able to move up and down in relation to the frame.

In order to facilitate directional change of the handtruck, a device has been utilized in which a rotatable shaft capable of rotating around an axis normal to the floor surface is mounted on bearings, and wheels are installed on a shaft which is unitarily formed together with the rotatable shaft. In such a construction, the wheels can rotate around the shaft and, at the same time, can rotate together with the rotatable shaft. In such a way, directional change of the wheels can be easily achieved.

However, although the direction of the handtruck having such wheels can be easily changed, the wheels do not move up and down in relation to the frame. Therefore, when the handtruck is moved on an uneven surface, for instance, on a stairs, the movement of the wheels is directly transmitted to the frame of the handtruck, and thereby the load on the handtruck is moved and falls onto the floor or the stairs. It was a problem requiring a solution.

SUMMARY OF THE INVENTION

The object of the present invention is to provide a handtruck for use in carrying a load in which direction change thereof can be easily achieved and at the same time, the up-and-down movement of the load rack turns out to be small and thereby the load on the load rack is stably conveyed even in the case of conveying the load on an uneven surface, and consequently transportation labor can be reduced.

The present invention described a handtruck for carrying a load, in which the handtruck comprises springs installed on the frame, a connection shaft received rotatably on bearings mounted on the opposite end portion of the springs and substantially parallel with the lateral extent of the load rack, a support member for supporting a first pair of wheels which is firmly fixed to the connection shaft, and another support member for supporting a second pair of wheels which is also firmly fixed to the connection shaft, and a rotation shaft rotatably mounted on the support member for supporting the second pair of wheels in order to cause the second wheels to rotate around the shaft axis approximately normal to the shaft axis of the connection shaft.

BRIEF DESCRIPTION OF THE DRAWINGS

FIGS. 3(a), 3(b) and 3(c) are, respectively, a plan view, a front view and a side view of a handtruck for carrying a load according to the present invention.

FIGS. 5(a), 5(b) and 5(c) are views for explaining variations in the position of the handtruck on a stairs.

DESCRIPTION OF THE PREFERRED EMBODIMENTS

Figure 1:
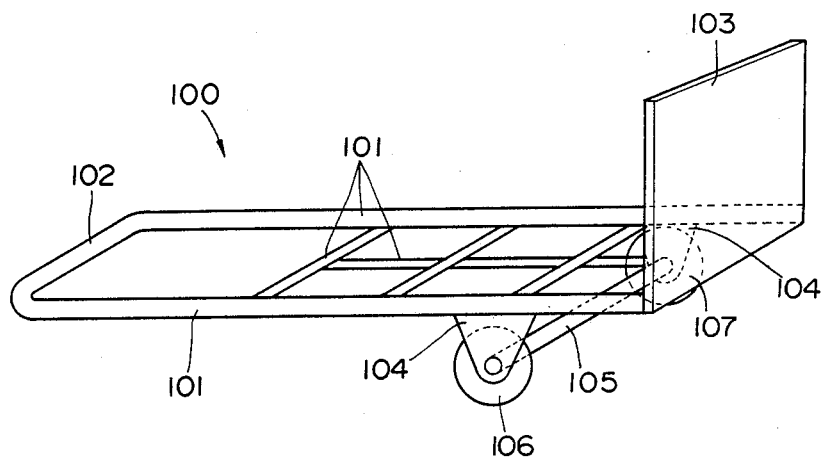
FIG. 1 is a perspective view of a conventional handtruck for use in carrying a load.

Conventionally, a handtruck 100 shown in FIG. 1 is provided with a load rack or frame 101 for receiving a load, a handle 102 for manipulating the handtruck, and a back plate 103. Bearings 104 and 105 are fixedly mounted on the frame 101. A wheel axle 105 is rotatably mounted on the bearings 104 and 105, and wheels 106 and 107 are installed at the both sides of the wheel axle 105. The handtruck 100 has the wheels 106 and 107 installed in such a way so as to be easily conveyed when moved along a straight line on a flat floor. However, since the wheels 106 and 107 are so constructed that they cannot rotate around a shaft axis normal to the wheel axle 105, it is not easy to change the direction of the handtruck 100. And further, the wheels 106 and 107 are not installed so as to move up and down in relation to the frame 101.

Figure 2:
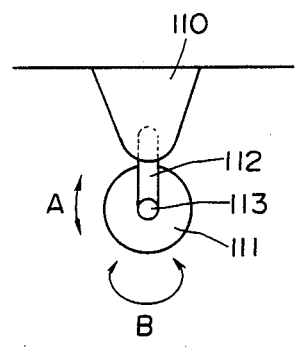
FIG. 2 is a view showing the wheels portions of such conventional handtruck.

In order to facilitate directional change of the handtruck 100, a device as shown in FIG. 2 has been utilized. In the device shown in FIG. 2, a rotatable shaft 112 capable of rotating around a shaft axis normal to the floor surface is mounted on bearings 110, and wheels 111 are installed on the shaft 113 which is unitarily formed together with the rotatable shaft 112. In such a construction, the wheels 111 can rotate around the shaft 113 in a direction shown by arrow A. And, at the same time, the wheels can rotate in a direction shown by arrow B together with the rotatable shaft 112. In such a way, directional change of the wheels can be easily achieved.

However, although the direction of the handtruck having the wheels 111 as shown in FIG. 2 can be easily changed, the wheels 111 do not move up and down in relation to the frame. Therefore, when the handtruck is moved on an uneven surface, for instance, on stairs, the movement of the wheels 111 is directly transmitted to the frame of the handtruck, and thereby the load on the handtruck moves and falls onto the floor or the stairs. It was a problem requiring a solution.

An embodiment of the present invention is explained hereinafter in conjunction with the attached drawings. FIGS. 3(a), 3(b) and 3(c) are, respectively, a plan view, a front view and a side view of a handtruck for carrying a load according to the present invention. In FIGS. 3(a), 3(b) and 3(c), the handtruck 1 comprises a frame 101 for piling up the load thereon, a back plate 20 mounted on one end portion of the frame 101 for supporting the load piled up on the frame 101, and a handle 2 mounted on the other end portion of the frame 101.

The back plate 20 is bendably attached to the frame 101. The load can be easily loaded or unloaded by bending the back plate 20. And further, a stop bar 22 is rotatably received on the handle 20. At the time of transporting the load, the stop bar 22 is kept at a position shown in the broken lines represented by the referenced numeral 22. On the contrary, at the time of loading or unloading the load, the stop bar 22 may be kept at another position shown in solid lines and represented by the reference numeral 22 so as to directly touch the floor 200. Preferably, a lock 23 can be employed in order to fix the stop bar 22 to the handle 2.

Furthermore, a pair of double thickness springs 3 are mounted on the frame 101 through a pair of spring mounting plates 13 fixedly attached thereto. Bearings 14 for receiving the connection shaft 4 are provided at the end portion of the springs 3 opposite to the spring mounting plate 13. The connection shaft 4 is rotatably mounted in the bearings 14. A pair of support members 5 for supporting a first pair of wheels 7 and a support member 6 for supporting a second pair of wheels 8 are fixedly attached to and connected with the connection shaft 4 and extend in opposite directions to each other. In such a construction, the pair of support members 5 and the support member 6 move unitarily. For instance, when the support members 5 rotate clockwise by a predetermined angle around the connection shaft 4, the support member 6 rotates counterclockwise at the same angle as that of the rotation angle of the support members 5. A first shaft 12 having an axis parallel with the axis of the connection shaft 4 is mounted rotatably on the pair of support members 5 at an opposite side to the connection shaft 4. The first pair of wheels 7 are mounted on the first shaft 12 at positions separated from each other. And further, a rotation shaft 9 having an axis normal to the surface of the support member 6 is rotatably mounted on the support member 6 at the opposite side to the connection shaft 4. At the lower end portion of the rotation shaft 9, a second shaft 11 having an axis parallel with the axis of the connection shaft 4 is rotatably mounted. A second pair of wheels 8 are mounted on the second shaft 11 adjacently to each other.

With respect to the handtruck 1 constructed as mentioned above, since the rotation shaft 9 can rotate around the axis normal to the surface of the support member 6 and the second shaft 11 is mounted so as to rotate around the rotation shaft 9, the second pair of wheels 8 can change their direction freely. Therefore, the direction of the handtruck 1 can be easily changed as will be described later. And further, in connection with the first wheels 7 and the second wheels 8, the distance or height thereof from the frame 101 can be freely adjusted by use of the spring 3 for the purpose of preventing movement thereof from being transmitted directly to the frame 101. Furthermore, since the first wheels 7 and the second wheels 8 rotate in opposite directions to each other with the same angle by means of the connection shaft 4 rotatably received in the bearings installed at the spring 3, the frame 1 can be stably moved even in the case of transporting or moving the handtruck 1 on an uneven surface, for instance, on a stairs as will be described later.

Figures 4A, 4B, 4C:
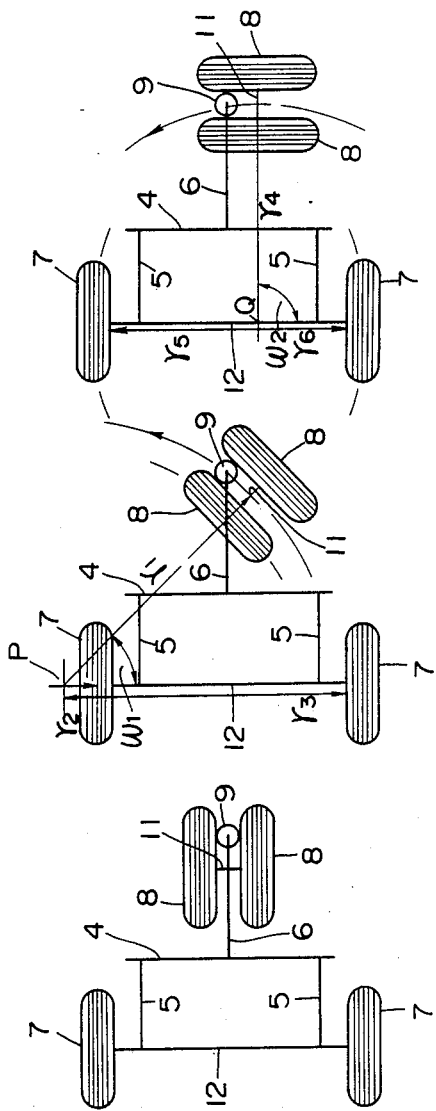
FIGS. 4(a), 4(b) and 4(c) are, respectively, views showing variations of the handtruck's direction of movement.

Referring to FIGS. 4(a), 4(b) and 4(c), the operation of changing the direction of the handtruck 1 is explained. FIG. 4(a) shows a condition of conveying the handtruck straight. At this time, the second shaft 11 mounting thereon the second pair of wheels 8 is parallel with the connection shaft 4 and the first shaft 12 mounting thereon the first pair of wheels 7. Next, when a force is applied to the handle 2 in a direction normal to the longitudinal direction of the handtruck 1, the rotation shaft 9 rotatably mounted on the support member 6 as shown in FIG. 4(b) rotates, for instance, counterclockwise, and thereby the second shaft 11 and the second pair of wheels 8 turn to a position no longer parallel with the connection shaft 4 and the first shaft 12. Namely, the whole portion of the handtruck 1 changes its direction thereof counterclockwise around a point P. The second wheels 8 move so as to define an arc line of radius $r_1$ around the point P. The first pair of wheels 7, 7 follow the movement of the second wheels 8, 8. One of the wheels 7 moves so as to define an arc line of radius $r_2$ around the point P while the other of the wheels 7 moves so as to define an arc line of radius $r_3$ therearound. At this time, the second shaft 11 is inclined at angle of $w_1$ in relation to the connection shaft 4 and the first shaft 12.

Furthermore, when a force for changing the direction of the handtruck 1 is further applied to the handle 2, the rotation shaft 9 further rotates as shown in FIG. 4(c), and thereby the second shaft 11 and the second pair of wheels 8 further changes the direction thereof in relation to the connection shaft 4 and the first shaft 12. FIG. 4(c) shows a condition in which the second shaft 11 and the second pair of wheels 8 change the direction thereof by the rotation angle of about 90° in relation to the connection shaft 4 and the first shaft 12. When the condition changes from that of FIG. 4(b) to that of FIG. 4(c), the central point of the handtruck's rotation moves from P to Q, and the second shaft 11 and the second pair of wheels 8 move so as to define an arc line of radius $r_4$ around the point Q. On the other hand, one of the first pair of wheels 7 moves so as to define an arc line of radius $r_5$ around the point Q while the other of the same moves so as to define an arc line of radius $r_6$ around the point Q. At this time, the second shaft 11 is inclined at an angle of $w_2$ approximately equal to 90° in relation to the connection shaft 4 and the first shaft 12.

In such a manner, when a force is applied to the handle 2 in a direction normal to the longitudinal direction of the handtruck 1, the rotation shaft 9 rotates and thereby the second shaft 11 and the second wheels 8 rotate in relation to the connection shaft 4 and the first shaft 12. Consequently, the handtruck 1 follows the rotating direction of the rotation shaft 9 as a whole, so that the direction of the handtruck 1 can be easily changed.

Next, referring to FIG. 5, the operation of the handtruck's movement at the time of conveying the handtruck 1 on a stairs is explained hereinafter.

FIG. 5(a) shows a condition of the handtruck 1 in which the second pair of wheels 8 start to be moved on the stairs. The second wheels 8 touch the step edge 50a of the stairs while the first wheels 7 are still on the horizontal floor surface below the stairs. At this time, the second wheels 8 receive a force in a direction shown by an arrow $D_1$ from the step edge 50a. The first wheels 7 and the second wheels 8 are unitarily connected with each other by means of the connection shaft 4. Therefore, when the second wheels 8 are subjected to the reaction force in the direction shown by the arrow $D_1$, the first wheels 7 receive the force in the direction shown by the arrow $C_1$ following thereto, and the angle $\theta_1$ formed between the line connecting the first wheels 7 and the second wheels 8 relative to horizontal turns out to be large. However, since the opening angle of the spring 3 decreases in accordance with the increase of the angle $\theta_1$, the inclination angle of the frame 101 or the inclination angle $\phi$ of the back plate 20 in relation to the horizontal surface is hardly affected by the variation of the angle $\theta_1$.

Furthermore, when the handtruck 1 is moved on the stairs, and as shown in FIG. 5(b) the second wheels 8 move from the step edge 50a little by little to the flat (even) position 50b and the first wheels 7 approach the step edge 50c, the second wheels 8 and the first wheels 7 are subjected to, respectively, reaction forces $D_2$ and $C_2$ in the opposite directions to the directions shown in FIG. 5(a). Consequently, the angle $\theta_2$ of the line between the first wheels 7 and the second wheels 8 in relation to the horizontal surface turns out to be smaller than the angle $\theta_1$. However, the opening angle of the spring 3 increases in accordance with the decrease of the angle $\theta_2$, and the angle $\phi$ formed between the back plate 20 and the horizontal surface hardly changes compared with the case of FIG. (5a).

And further, when the handtruck 1 is moved to the position shown in FIG. 5(c), the second wheels 8 are on the flat place 50d on the stairs while the first wheels 7 are on the step edge 50e, the reaction forces $C_3$ and $D_3$, are respectively, applied to the first wheels 7 and the second wheels 8 in the same directions as the directions shown in FIG. 5(b), and the angle $\theta_3$ of the line between the first wheels 7 and the second wheels 8 in relation to the horizontal surface turns out to be further smaller than the angle $\theta_2$ shown in FIG. 5(b). However, since the opening angle of the spring 3 turns out to be further larger than that shown in FIG. 5(b), the angle $\phi$ formed between the back plate 20 and the horizontal surface hardly changes compared with the case of FIG. 5(b).

In such a manner, even in the case where the handtruck 1 is moved on an uneven surface and the angle of the line between the first wheels 7 and the second wheels 8 in relation to the horizontal surface varies frequently, the variation of the angle is absorbed by the spring 3 and thereby the angle formed between the frame 101 for receiving the load or the back plate 20 and the horizontal surface hardly changes. Consequently, the extent of up-and-down movement of the frame 101 or the back plate 20 is small, and therefore the load can be transported in stable condition.

Figure 6:
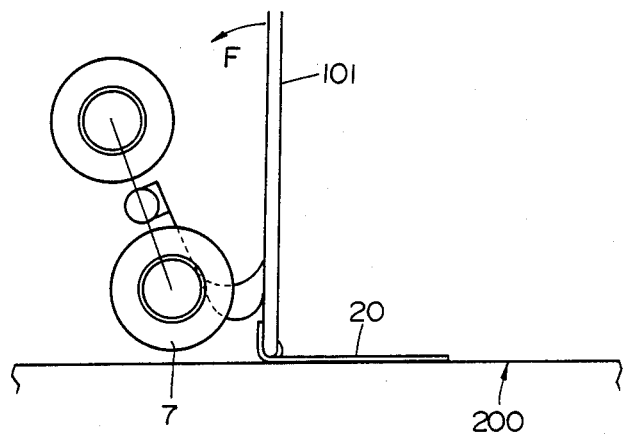
FIG. 6 is a view showing the arrangement of the handtruck at the time of loading and unloading.

Moreover, with respect to the handtruck 1 according to the present invention, when the load is loaded or unloaded, the back plate 20 is allowed to be rotated in relation to the frame 101 so as to bend. Otherwise, with the back plate 20 fixed to the frame 101 as shown in FIG. 6, the whole portion of the handtruck is turned by 90°, the back plate 20 is put on the floor 200, and the load is loaded or unloaded. When the condition of the handtruck is returned to the initial one, that is, the condition capable of transporting the handtruck after the afore-mentioned procedure, it is sufficient to apply a slight force in the direction shown by the arrow F. The first wheels 7 rotate on the floor surface 200 by virtue of the above-mentioned force and the whole portion of the handtruck can be rotated in a direction shown by the arrow F.

And further, at the time of transporting the handtruck 1, the stop bar 22 tightly mounted on the handle 2 is rotated to the position of the broken line shown by the reference numeral 22 and fixed thereon by means of the lock 23. On the other hand, when the handtruck 1 is stopped, the stop bar 22 may be allowed to be rotated to the solid line position indicated by the reference number 22 and put on the floor surface 200, upon being fixed to the handle 2 by means of the lock 23.

The handtruck 1 for carrying the load according to the present invention has been described only in the case of carrying the same by hand. However, handtruck 1 is not limited to such application. For instance, a power source device cane be mounted on the handtruck 1 and the second wheels can be driven thereby.

As is apparent from the foregoing description, according to the present invention, a support member for supporting a first pair of wheels and another support member for supporting a second pair of wheels are fixedly attached to the connection shaft in such a manner that all of those elements unitarily move. Since the connection shaft is received rotatably through the bearings of the spring mounted on the frame, even though the first pair of wheels and second pair of wheels change the height thereof in relation to the frame, the height variation is absorbed by the spring mounted on the frame, and thereby the variation is not directly transmitted to the frame. And further, when the handtruck is moved along an uneven surface, for instance, on a stairs, even in the case where the angle of the line between the first pair of wheels and the second pair of wheels in relation to the horizontal surface changes, the angle variation and the height variation following the angle variation are absorbed by the spring. Consequently, the angle formed between the frame and the horizontal surface hardly changes, so that the load piled up on the frame can be stably carried.

Furthermore, since the second wheels can be rotated around their axes almost normal to that of the axes of the second wheels, the direction of the handtruck can be easily changed.

In such a way, according to the present invention, the up-and-down (height) variation of the frame can be decreased, and the direction thereof can be changed freely. As a result, the labor of operating the handtruck can be considerably reduced.

I claim:

1. A hand truck comprising an unsprung frame, a sprung carriage means, double thickness spring means resiliently supporting said carriage means from said frame, said double thickness spring means comprising a pair of generally U-shaped spring band elements with each band element having a curvilinear U-shaped intermediate section connecting a first and a second end section, the first end section of each band element of each pair being in abutting relationship with each other, and the second end section of each pair being in abutting relationship with each other, the U-shaped intermediate section of each band element of each pair being spaced from one another, said first and second abutting end sections converging toward said spaced intermediate sections to define an opening spring angle between said first and second abutting end sections, said two abutting first end sections being connected to said frame, said two abutting second end sections having rotating means rotatably supporting said carriage means, said carriage means comprising wheel support means which rotatably support first wheel means for rotation about a first rotational axis and which also rotatably support second wheel means for rotation about a second rotation axis, said hand truck being operable in a stair-climbing operational mode in which said first and second rotational axes are substantially parallel to one another and in which said first and second rotational axes defining a support means plane which extends between and which contains said first and second rotational axes, said frame means defining a load-receiving surface on which the load to be carried by the hand truck is disposed, said carriage means being resiliently supported from said frame means by said double thickness spring means such that as the hand truck progressively moves up successive steps, the angle of said support means plane relative to horizontal varies while the angle of said load-receiving surface relative to horizontal remains substantially constant as said opening spring angle varies.

2. A hand truck for carrying a load comprising a frame for receiving said load, a carriage means, double thickness spring means resiliently supporting said carriage means from said frame, said carriage means having a connecting shaft means, said double thickness spring means comprising a pair of generally U-shaped spring band elements with each band element having a curvilinear U-shaped intermediate section connecting a first and a second end section, the first end sections of each band element being in abutting relationship with each other and the second end section of each band element being in abutting relationship with each other, the U-shaped intermediate sections of each band element being spaced from one another, said first and second abutting end sections converging toward said spaced intermediate sections to define an opening spring angle between said first and second abutting end sections, said abutting first end sections being connected to said frame, said abutting second end sections having rotating means rotatably supporting said connecting shaft means, said carriage means further comprising support means mounted on said connecting shaft means, first wheel support means mounted on said support means and rotatably supporting first wheel means for rotation about a first rotational axis, and second wheel support means mounted on said support means for rotatably supporting second wheel means for rotation about a second rotational axis, said hand truck being operable in a stair-climbing operational mode in which said first and second rotational axes are substantially parallel to one another and in which said first and second rotational axes are each substantially horizontally disposed, said first and second rotational axes defining a support means plane which varies relative to horizontal as the hand truck moves up a stairs in said stair-climbing operational mode, said frame being disposed at a substantially constant angle relative to horizontal as said opening spring angle varies as the hand truck moves up said stairs in said stair-climbing operational mode.

3. A hand truck according to claim 2, wherein said first wheel support means comprises a pair of spaced support members each fixed to said shaft at two axially spaced locations on said shaft, said first wheel means comprising one wheel rotatably mounted on one of said spaced support members and another wheel mounted on the other of said spaced support members, said second wheel support means comprising a central support member fixed to said shaft at a generally central axial location of said shaft between said two axially spaced locations, said central support member pivotably supporting said pivotal shaft, said first and second wheels being moveable along two spaced paths of travel as said hand truck moves, said second wheel means being disposed between said two spaced paths.

4. A hand truck according to claim 3, wherein said rotating means are rotatable mounted on said shaft at two spaced locations, said second wheel support means being connected to said shaft at a position of said shaft between said two spaced location.

5. A hand truck according to claim 3, wherein said second wheel means comprises a pair of spaced wheels.

6. A hand truck according to claim 2 wherein said second wheel support means comprises a rotatable shaft supporting said second wheel means for rotation about a third rotational axis, said third rotational axis being perpendicular to said first rotational axis.

7. A hand truck according to claim 6 wherein said hand truck had a load-receiving surface on which the load to be carried by the hand truck is disposed, said hand truck having an operational position in which said load-receiving surface is substantially horizontally disposed, said support means plane being substantially horizontally disposed when said hand truck is in said operational position.

8. A hand truck according to claim 2 wherein the axis of said connecting shaft means is disposed in said support means plane.

9. A hand truck for carrying a load comprising a frame for receiving said load, a carriage means, double thickness spring means resiliently supporting said carriage means from said frame, said carriage means having a connecting shaft, said double thickness spring means comprising a pair of generally U-shaped spring band elements with each band element having a curvilinear U-shaped intermediate section connecting a first and a second end section, the first end sections of each band element being in abutting relationship with each other and the second end sections of each band element being in abutting relationship with each other, the U-shaped intermediate section of each band element being spaced from one another, said first and second abutting end sections converging toward said spaced intermediate sections to define an opening spring angle between said first and second abutting end sections, said abutting first end sections being connected to said frame, said abutting second end sections having rotating means rotatably supporting said connecting shaft, said carriage means further comprising first wheel support means fixed to said shaft and rotatably supporting first wheel means for rotation about a first rotational axis, said first wheel support means comprising a pair of spaced support members each fixed to said shaft at two axially spaced locations on said shaft, said first wheel means comprising one wheel rotatably mounted on one of said spaced support members and another wheel mounted on the other of said spaced support members, and second wheel support means fixed to said shaft for rotatably supporting second wheel means for rotation about a second rotational axis, said second wheel support means comprising a pivotal shaft pivotably supporting said second wheel means for rotational movement about a third rotational axis, said third rotational axis being perpendicular to said first rotational axis, said second wheel support means further comprising a central support member fixed to said shaft at a generally central axial location of said shaft between said two axially spaced locations, said central support member pivotably supporting said pivotal shaft, said first and second wheels being moveable along two spaced paths of travel as said hand truck moves, said second wheel means being disposed between said two spaced paths.

10. A hand truck according to claim 9 wherein said hand truck has a load-receiving surface on which the load to be carried by the hand truck is disposed, and stop bar means pivotal on said frame to an operational position in which one end of said stop bar means and said first and second wheel means all contact a horizontal ground surface to dispose said load-receiving surface in a substantially horizontal plane.

11. A hand truck according to claim 9 wherein said connecting shaft and said first and and second wheel support means are formed as a rigid and unitary structure.

12. A handtruck according to claim 9 wherein said hand truck is operable in a straight-line operational mode in which the hand truck moves along a substantially straight line path, sand hand truck having an elongate axis parallel to said straight line path, said hand truck having a forward end and a rear end, said first rotational axis being disposed forwardly of said second rotational axis, said first rotational axis and the axis of said connecting shaft being perpendicular to said elongate axis.

13. A hand truck according to claim 12 wherein, said first wheel support means extends from said connecting shaft in a generally forward direction, said second wheel support means extending from said connecting shaft in a generally opposite rearward direction.

14. A hand truck according to claim 12 wherein said second rotational axis is disposed parallel to said first rotational axis when the hand truck is in said straight-line operational mode, said connecting shaft being disposed between said first and second wheel means and having a connecting shaft axis which is parallel to said first rotational axis.

15. A hand truck according to claim 12 wherein said pivotal shaft is disposed so that its axis is substantially vertically disposed when the hand truck is in said straight-line operational mode.

16. A hand truck according to claim 12 wherein said pivotal shaft is disposed rearwardly of said second rotational axis when the hand truck is in said straight-line operational mode.

17. A hand truck according to claim 9 wherein said pivotal shaft is disposed so that the axis of said pivotal shaft is spaced from said second rotational axis.

18. A hand truck according to claim 13 wherein said second wheel support means sections comprises arcuate support members having two ends in which one end is rigidly connected to said connecting shaft and the other end supports said pivotal shaft, said arcuate support member extending arcuately upwardly and rearwardly from said one end to said other end.

19. A hand truck according to claim 18 wherein said other end is disposed at a distance from said second rotational axis which is greater than the diameter of said second wheel means.

20. A hand truck according to claim 9 wherein said first wheel means comprises first and second wheel means axially spaced from one another a first axial distance, said second wheel means comprising third and fourth wheels spaced from one another a second axial distance which is less than said first axial distance.

* * * * *